Feb. 22, 1966   M. C. BERGER ETAL   3,236,045
COMBUSTION GAS DISCHARGE SYSTEM
Filed Feb. 28, 1964   2 Sheets-Sheet 1

Inventors
Michel C. Berger
Jacques G. Languillaume
By
Attorneys

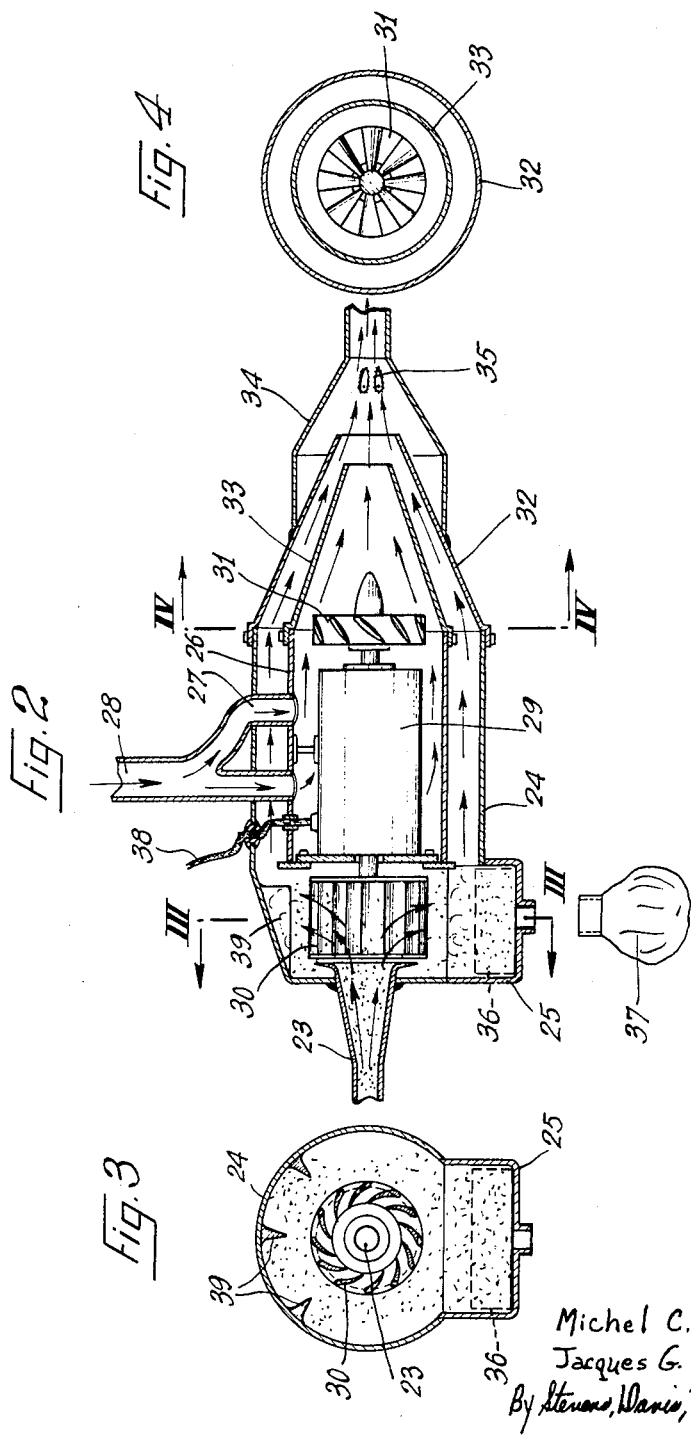

United States Patent Office 3,236,045
Patented Feb. 22, 1966

3,236,045
COMBUSTION GAS DISCHARGE SYSTEM
Michel C. Berger, St-Lambert-des-Bois, and Jacques G. Languillaume, Chalet de Pincevent par Ormesson, France
Filed Feb. 28, 1964, Ser. No. 348,127
Claims priority, application France, Mar. 1, 1963, 926,581
8 Claims. (Cl. 60—30)

Air pollution with combustion products from fuel-burning apparatus of all kinds constitutes a problem of constantly increasing dimensions. The major sources of pollution include fuel-burning heaters in homes and industrial plants, and the combustion engines of road vehicles and other installations.

The polluting products of combustion occur both in the gaseous and in the solid and liquid phases. While various systems are now available for separating the solid and liquid particles from the effluent stream and preventing their discharge into the atmosphere with varying degrees of success, toxic gaseous and vapour constituents are much more difficult to remove and constitute a major health hazard wherever they are discharged at high local concentrations into the atmosphere.

It is an object of this invention to provide an improved system for the discharge of combustion products from fuel burning apparatus of all kinds which not only will provide for an efficient removal of solid and liquid particles from the stream of effluent combustion gases but will also greatly diminish the harmfulness of the toxic gases and vapours discharged, by diluting them with several times their volume of atmospheric air, and causing them to be effectively and rapidly dispersed and carried away by natural air currents.

Other objects are to provide improved combustion discharge systems applicable both to fuel-burning heating devices and internal combustion engines including vehicle engines, which will substantially increase the efficiency of combustion and general operation of the fuel-burning device or engine to which the system is applied, while being simple and economical to make, operate and maintain, and contributing to an eminent degree to the reduction of air pollution.

In accordance with an aspect of the invention there is provided a system for discharging a stream of combustion products from fuel-burning apparatus comprising a discharge conduit leading from the apparatus and discharging to the atmosphere, venturi nozzle means within the conduit and defining therewith an axial inner flowpath and an annular outer flowpath, means for delivering said stream over said outer flowpath, and means for delivering atmospheric air under pressure over said inner flowpath whereby to increase the velocity of and dilute said stream of combustion products as it is discharged to atmosphere.

According to a feature of the invention means are provided for removing at least a major proportion of solid (and liquid) particles from said stream ahead of the upstream end of said outer flowpath.

In a preferred embodiment of the invention the means for delivering atmospheric air under pressure over the inner flowpath comprises an axial-flow impeller positioned within the venturi means and air-intake ducting extending across said annular flowpath to conduct atmospheric air from outside the discharge conduit into said inner flowpath ahead of the impeller. According to a feature of this embodiment the axial-flow impeller is driven by a motor mounted within the venturi means axially of said conduit. Preferably moreover there is provided a centrifugal impeller mounted ahead of the venturi nozzle means and driven from the same motor as that driving the axial-flow impeller, said centrifugal impeller serving to propel the stream of combustion products radially outward and into said outer flowpath, and simultaneously flinging said products against a surrounding annular wall of a separator chamber to cause the afore-mentioned removal of the solid particles contained in the stream, which particles can then be collected from the bottom of said separator chamber.

Where the invention is applied to a fixed installation such as the fuel burning furnace of a domestic heating system or the like, the arrangement is normally such that the effluent stream of combustion gases and entraining air are directed vertically upward. The velocity imparted to the effluent stream by the venturi effect of the entraining air according to the invention is so great that the effluents are discharged to a considerable height above the outlet of the discharge conduit so as to be readily taken up by the large-scale atmospheric airstreams normally prevalent and effectively dispersed. Thus the invention makes it possible to dispense with the excessively tall chimney stacks that would otherwise be required to achieve a similar result in the prior art. Moreover, the dilution effected by the entraining air at the outlet from the discharge conduit is such e.g. in a ratio of three or more parts air per part combustion gases that the harmful character of the gases, e.g. from the exhausts of motor vehicles, is very greatly attenuated.

At the same time the invention achieves, where desired, a substantially total removal and recovery of any solid and liquid particles suspended in the stream of combustion gases, over a size range of from about 1 to 100 microns or more.

Exemplary embodiments of the invention will now be described for purposes of illustration but not of limitation with reference to the accompanying drawings, wherein;

FIGURE 2 is a vertical sectional view of a system according to the invention as applied to the exhaust of a motor vehicle; and FIGURES 3 and 4 are cross sections on the lines III—III and IV—IV of FIGURE 2 respectively.

Figure 1:
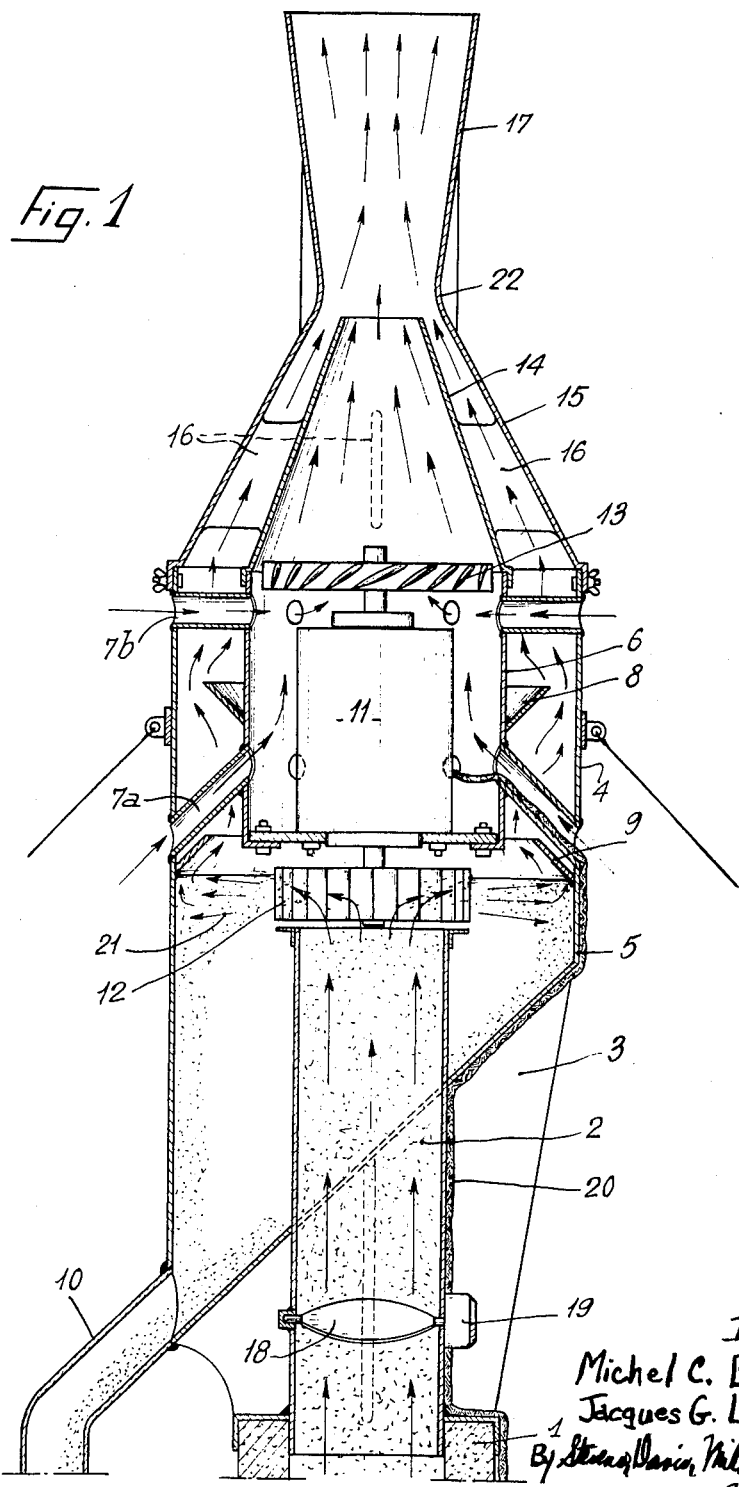
FIGURE 1 is a vertical sectional view of a combustion gas discharge system according to the invention as applied to a fixed fuel burning installation.

Referring to FIGURE 1, there is indicated at 1 the base of a conventional chimney stack, e.g. of brickwork, communicating at its lower end through a flue with the combustion chamler of a fuel burning furnace, not shown. Secured to and projecting upward from the stack 1 is a vertical conduit 2 made of sheet metal of suitable corrosion-resisting character. Around the upper part of conduit 2 there is provided a generally cylindrical casing or cowling 4 coaxial with the conduit and of larger diameter than it. The cowling 4 has a sloping base wall 5 through an aperture of which the conduit 2 extends, and is supported above the stack 1 by means of stiffeners such as 3. Mounted within the cowling 4 coaxially with it and with conduit 2 is a cylindrical wall 6, which is supported from the cowling 4 by means of generally radial ducts which serve as air intake ducts as will be later described. These ducts include a set of angularly spaced lower ducts 7a, inclined in an inward-upward sense, and a set of upper ducts 7b which are horizontal. The cylindrical wall 6 is of somewhat larger diameter than that of the conduit 2 and its lower end is spaced above the upper end of this conduit. Extending from the upper end of cylindrical wall 6 is an upwardly converging conical wall 14 constituting a venturi nozzle. The upper end of cylindrical cowling 4 is similarly extended upwardly with an upwardly converging section 15 which coaxially surrounds the venturi member 14, the cone angle of convergence of outer converging wall 15 being greater than that of the inner converging wall or venturi member 14.

It will be seen that the inner cylindro-conical structure comprising cylindrical wall 6 and its upwardly extending venturi member 14 defines within the outer cylindro-conical cowling structure 4–15, an axial inner space or flowpath, and an annular outer space or flowpath. As will presently appear the axial flowpath is for air and the outer flowpath for combustion gases. Positioned in the outer flowpath are deflector means serving to impart a sinuous character to the flow of gases through it. The deflector means as shown include an upper frustoconical baffle plate 8 projecting upward and outward from the cylindrical inner wall 6, and a lower frusto-conical baffle plate 9 projecting upward and inward from the base of the outer cowling wall 4.

The converging upper and outer conduit wall 15 is extended upwardly by a diverging outlet section 17 defining therewith a venturi throat 22. Stiffener plates 16 are provided between the inner and outer converging venturi sections 14 and 15.

Mounted coaxially within the cylindrical wall 6 and supported on a transverse base wall thereof is an electric motor 11. The motor has upwardly and downwardly projecting output shaft sections. The upper output shaft has mounted on it an axial-flow impeller rotor 13 positioned in the base of the inner venturi section 15. The lower output shaft of the motor 11 has mounted on it a tangential or centrifugal impeller rotor 12 positioned just above the upper end of the conduit 2.

The conduit 2 has a damper flap valve 18 mounted in its lower part. As shown, flap valve 18 has an actuating servo-motor 19 associated with it. An energizing conductor cable 20 is shown connected to both turbine motor 11 and damper servomotor 19 and to a source of electric power not shown.

Before describing the operation of the system a few words of explanation will be given regarding the composition of the effluent stream of combustion products. In the case of the flue gases from domestic heating systems the flue gases generally include toxic gas and vapour constituents such as carbon monoxide CO, sulfur dioxide and trioxide $SO_2$ and $SO_3$, various hydrocarbons as well as chlorine derivatives. There are further solid dust particles usually in the size range of from about 1 to 100 microns and comprising combustion residues such as ashes, soot, carbon, coke, lime, etc. Metal oxide vapours (e.g. zinc oxides, lead oxides, arsenous oxide, etc.) are also present. Lastly there are oily aerosol products of acidic and/or alkaline character. In the case of flue gases from industrial furnaces, additional toxic or harmful constituents are usually present, such as the fluorine compounds from aluminium processing plants. Valuable constituents such as chromic acid, bromide and other constituents may also be present in the effluent stream.

The effluent stream containing part or all of the above constituents as well as others is discharged from the stack 1 into the conduit 2, and is drawn up under the combined action of natural draft and the suction created at the top of conduit 2 by the centrifugal impeller 12. On reaching the top of conduit 2 the stream is subjected to a strong centrifugal action by impeller 12 and is projected against the inner wall surface of the chamber 4. Under this action any solid and liquid particles suspended in the effluent stream are separated and drop through the separating chamber 5 whence they are discharged through outlet pipe 10, and may be collected for processing or otherwise disposed of.

The gas and vapour constituents stripped of solid and liquid particles are passed upwards through the annular space between cylindrical walls 4 and 6 over a circuitous path as indicated by the arrows around the baffles 8 and 9, which serve to arrest any small and lightweight remaining particles in the stream which then drop back into the separator chamber. If desired, especially in cases where the effluent stream contains a relatively large proportion of very fine particles of the order of one micron in magnitude, the separating effect of the baffles 8 and 9 may be increased by the provision of ultrasonic vibrator means not shown, associated with the baffles such as 8 and 9, which then may be made suitably resilient.

Simultaneously the axial-flow impeller 13 positioned in the top of the cylindrical chamber 6 is acting to suck in atmospheric air from the exterior by way of the intake pipes 7a, 7b. The inflowing air through pipes 7a serves to cool the casing of motor 11. The inflowing air is discharged through impeller 13 up into the inner venturi nozzle member 14 whereby its velocity is increased. The high-velocity airstream issuing from the outlet of inner venturi 14 creates a strong suction effect at the throat 22 of the outer venturi member 15–17, so as to entrain at high velocity the stream of combustion gases flowing up through the annular outer space between the inner and outer venturi members 14, 15. At the same time the airstream serves to dilute the combustion gases entrained by it. The flowrates through the impellers 12 and 13 and other parameters of the system are preferably so adjusted that the resulting dilution of combustion gases with air is effected in a proportion of about 75% air for 25% gases. Most toxic gas and vapour constituents when diluted in this ratio become practically harmless.

The upper diverging outlet section or cowl 17, which has a small angle of divergence somewhat less than 8° for best operation, serves to discharge the resulting outlet stream to a considerable vertical height. This height is essentially determined by the power characteristics of the axial-flow impeller 13. Experiments performed with flue gases from apartment houses in the Paris area have shown that when the outlet stream is discharged to a height of about thirty meters above the tallest buildings in the area, the gas stream generally merges with the cooler and denser air currents of the atmosphere and is then dispersed upwardly and outwardly to considerable distances, so that it will not contribute to a perceptible degree to the pollution of the atmosphere of the city.

Another important advantage of the system described lies in a considerable improvement in the efficiency and uniformity of the draft and hence combustion conditions. Desirably the circuit of electric motor 11 may be connected in a regulating servo system with the fuel injector means of the combustion apparatus, on a stop-and-go or a continuous basis as desired, so as to regulate the draft in dependency on the operation of the combustion means. The servo-motor 19 actuating the flap 18 may also be included in such regulating system.

Where the system described is applied to industrial combustion furnaces, the recovery of valuable solid particles as described may present substantial economic advantage. Moreover, the height of the necessary chimney stacks is considerably reduced.

As earlier stated the invention is applicable to the exhaust gases of combustion engines, particularly motor vehicle engines. The exhaust gases of internal combustion engines contain a great number of harmful constituents including soot, dust, carbon and tarry deposits in solid and liquid form, minute lead particles and oxides, and noxious gases and vapours such as carbon monoxide, sulfur dioxide and trioxide, benzo-3,4-pyrene, nitrogen oxides, lead sulfide, lead tetraethyl oxide, chlorine and bromine compounds, and the like.

FIGURES 2–4 illustrate the application of the invention to the exhaust of an internal combustion engine. The system shown includes an inlet 23 preferably of slightly diverging shape connected to the exhaust of the engine, not shown. Inlet 23 opens into a cylindrical chamber 24 provided with a bottom collector portion 25. Mounted coaxially within chamber 24 is an inner cylindrical body 26 having its interior connected by way of axially spaced branch connections 27 with an air intake pipe 28 delivering cool air from the atmosphere. Air intake 28 may be positioned at an elevated level and fitted with a filter screen, not shown. Further, air intake 28 may be positional under the hood of the engine, thereby increasing the circulation of the air supply to the engine. Mounted within the cylindrical casing 26 is a coaxially arranged electric motor 29 energized by way of a cable 38 and driving from its one end an axial-flow impeller rotor 31 positioned in the downstream end of cylindrical casing 26 at the connection thereof with a frustoconically converging venturi extension 33. The motor 29 drives from its other end a centrifugal impeller rotor 30 positioned in the upstream end of chamber 24 just beyond the orifice of inlet 23 (in the sense of gas flow). The downstream end of outer cylindrical wall 24 is rearwardly extended by a frusto-conically converging outer venturi section 32 having a somewhat larger cone angle of convergence than inner venturi member 33. Surrounding the outlet ends of the venturis 33, 32 is an expansion chamber provided by an outlet cowl 34. Ozonizer means 35, e.g. in the form of a source of ultraviolet rays is desirably positioned in the expansion cowl 35 in the path of outflow of the exhaust gases.

In the base 25 of the collector chamber there may be provided a removable drawer 36. Alternatively a dispensable bag 37 may be connected with a bottom opening of the base 25 for collecting and disposing of the separated solids. Baffle fins 39 are shown as imparting turbulence to the gases discharged centrifugally by the impeller 30 against the outer wall surrounding it.

The operation of this system is generally the same as that of the system first described with reference to FIGURE 1. The exhaust products drawn in through pipe 23 by the combined actions of the engine exhaust and the suction created by impeller 30 are propelled radially outward by centrifugal impeller 30 and impinge against the surrounding wall of chamber 24. Solid and liquid particles in the centrifuged stream separate out and drop into the base collector 25 whence they may be periodically removed by means of drawer 36 or bag 37, while the exhaust gases substantially stripped of their solid content flow onward through the annular space between walls 24 and 26. Simultaneously axial-flow impeller 31 acts to draw in atmospheric air through piping 28-27 and the airflow serves to cool motor 29. The airflow is accelerated in inner venturi 33, and the gas flow is simultaneously somewhat accelerated through the outer venturi 32. In the region of the outlet orifices of both venturis the axial airflow entrains with it and dilutes the annular stream of exhaust gases and the combined outflowing stream issues through cowling 34 to the atmosphere behind the moving vehicle. Ozonizers 35 serve to introduce active oxygen atoms and convert the dilute carbon monoxide into carbon dioxide prior to discharge of the effluent stream.

The motor 29 is advantageously energized from the D.-C. generator driven by the vehicle engine and the speed of motor 29 can thus be made conveniently proportional to the speed of the vehicle engine.

In addition to the great reduction in the harmful properties of the exhaust gases and in air pollution achieved by the system described when applied to an automotive or other internal combustion engine, additional advantages are obtained. The suction created by this system in the exhaust pipe of the engine improves the scavenging action in the engine cylinders at all engine speeds, resistance to exhaust gas flow is removed yielding a slight but definite net increase in the available engine power and reduction in fuel consumption. Exhaust noise is found to be considerably lessened uniformly at all engine speeds. Tests have shown that the reduction in the normal exhaust noise level of motor vehicles equipped with the system described is of the order of 30%, and simultaneously the acoustic frequency range of the exhaust noise is consistently shifted towards the lower frequency values.

Substantially constant temperatures are maintained throughout the exhaust circuit of the vehicle from the exhaust valves to the final exhaust outlet.

It will be understood that various modifications may be introduced into the embodiments illustrated and described without exceeding the scope of the invention. In the claims, the terms upstream and downstream refer to the sense of gas flow through the system.

What we claim is:

1. A system for discharging a stream of gaseous exhaust products from combustion apparatus comprising discharge conduit means leading from the apparatus and discharging to the atmosphere, a nozzle member within the conduit means including a venturi section and defining with said conduit means an axial inner flowpath and an annular outer flowpath said flowpaths merging at their downstream ends, a centrifugal impeller ahead of the upstream end of said flowpath acting on the stream of combustion products at least for propelling the same over said outer flowpath; a further impeller for delivering air under pressure over the inner flowpath to mingle with said stream at the merging of the flowpaths whereby to increase the velocity of and dilute said stream of exhaust products as it discharged to atmosphere.

2. A system for discharging a stream of gaseous combustion products from fuel-burning apparatus comprising conduit means leading from the apparatus to atmosphere, an inner conduit section positioned within said conduit means including a converging downstream end portion and defining within the conduit means an axial inner flowpath and an annular outer flowpath said flowpaths merging at their downstream ends, piping extending across said annular flowpath to connect the inner flowpath with the atmosphere around the conduit means, first impeller means within said inner conduit section for delivering said atmospheric air at high velocity into and over said inner flowpath and second centrifugal impeller means in the conduit means ahead of the upstream ends of the flowpaths for delivering said stream into and over said outer flowpath for dilution and entrainment by said air as said stream is discharged to atmosphere.

3. The system defined in claim 2, including an electric motor mounted within said inner conduit section and having output shaft sections projecting from opposite ends thereof axially of said conduit section, and said first and second impeller means being coupled to said opposite shaft sections.

4. A system for discharging gaseous combustion products from combustion apparatus comprising coaxial outer and inner conduits discharging to atmosphere, at least said inner conduit having a conically converging downstream end section, said conduits defining an axial inner flowpath and an annular outer flowpath, air-intake pipe means connecting the inner flowpath with atmosphere, means defining a separator chamber continuous with said outer flowpath ahead of the upstream end of the inner conduit, a pipe leading from said apparatus and opening into said separator chamber coaxially with said conduits, a centrifugal impeller positioned in said chamber adjacent to and coaxial with the end opening of said pipe, an axial impeller positioned in said inner conduit coaxially therewith, and motor means for driving both impellers so as to deliver simultaneously said combustion products and air over the respective flowpaths for mutual entrainment and dilution at the downstream ends of said conduits prior to discharge to atmosphere.

5. The system defined in claim 4, wherein said impeller driving means comprises an electric motor positioned in the inner conduit coaxially therewith.

6. The system defined in claim 1, including a diverging conduit section connected with the downstream end section of the outer conduit beyond the downstream end section of the inner conduit.

7. A system for discharging substantially gaseous combustion products from an apparatus generating them comprising a substantially cylindrical chamber for separating solid particles from the gaseous portion of said products; a pipe coaxial to said chamber for conveying said products from said apparatus into said chamber; a centrifugal impeller coaxial to said chamber and pipe and carried at the pipe outlet in said chamber; means for removing said particles from the lower portion of said chamber; piping means beyond said chamber for conveying said gaseous portion from said chamber to atmosphere; air-intake pipe means connecting said latter piping means with the atmosphere; and means for imeplling air through said air intake pipe means and for mixing said air with said gaseous portion and driving it to atmosphere.

8. A system for discharging gaseous combustion products from a fuel-burning apparatus comprising coaxially disposed outer and inner conduits having conically converging downstream end sections discharging to atmosphere and defining an axial inner flowpath and an annular outer flowpath, said outer conduit having a downstream end converging at a larger cone angle than that of said inner conduit, radial conduit means connecting the upstream end of said axial inner flowpath with atmosphere, a separating chamber connected between said apparatus and the upstream end of both said flowpaths, means for removing separated particles from said chamber, a first impeller in said inner flowpath, a second impeller in said outer flowpath and within said chamber, means for rotating both said impellers to thereby entrain and dilute said gaseous products with air for discharge to atmosphere, and means responsive to the combustion rate of said apparatus for controlling the angular speed of said axial flow impeller.

References Cited by the Examiner

UNITED STATES PATENTS

| | | | |
|---|---|---|---|
| 877,431 | 1/1908 | Jones | 60—30 |
| 1,583,621 | 5/1926 | Steinberg | 60—30 X |
| 1,668,872 | 5/1928 | Schutz. | |
| 1,680,537 | 8/1928 | Grooms | 60—30 |
| 1,716,481 | 6/1929 | Bilsky | 60—30 X |
| 2,065,681 | 12/1936 | Fogas | 60—30 X |
| 2,725,950 | 12/1955 | Christiansen | 23—277 |
| 2,795,103 | 6/1957 | Jenison. | |
| 2,803,309 | 8/1957 | Baker | 60—30 X |
| 3,056,467 | 10/1962 | Ravich | 23—277 |

FOREIGN PATENTS

| | | |
|---|---|---|
| 796,818 | 4/1936 | France. |
| 206,118 | 7/1924 | Great Britain. |
| 285,390 | 10/1928 | Great Britain. |

SAMUEL LEVINE, *Primary Examiner.*

EDGAR W. GEOGHEGAN, *Examiner.*